T. J. BIGGS.
NUT LOCK.
APPLICATION FILED DEC. 3, 1917.

1,288,482.

Patented Dec. 24, 1918.

Inventor
T. J. Biggs
By Watson E. Coleman
Attorney

UNITED STATES PATENT OFFICE.

THOMAS JEFFERSON BIGGS, OF OAK CREEK, COLORADO.

NUT-LOCK.

1,288,482.　　　　　Specification of Letters Patent.　　Patented Dec. 24, 1918.

Application filed December 3, 1917.　Serial No. 205,219.

*To all whom it may concern:*

Be it known that I, THOMAS J. BIGGS, a citizen of the United States, residing at Oak Creek, in the county of Routt and State of Colorado, have invented certain new and useful Improvements in Nut-Locks, of which the following is a specification, reference being had to the accompanying drawings.

This invention relates to nut locks and has for its primary object to provide simply constructed and very effective means which is automatically actuated in the operation of threading the nut home upon the bolt whereby the nut is securely locked in adjusted position and held against reverse turning movement.

It is another and more particular object of my invention to provide a device for the above purpose embodying a washer preferably constructed of spring steel and having a split resilient radially inclined flange projecting inwardly from its outer marginal portion and threaded for engagement upon the bolt, said flange having a binding locking engagement with the bolt threads when the nut is turned against the marginal portion of the washer to force the same against the face of the object.

It is a further general object of the invention to provide a nut lock as above characterized which may be readily manufactured at small cost, which is exceedingly strong and durable in its construction and which will in no way injure the bolt threads and can be easily and quickly applied to or removed from the bolt.

With the above and other objects in view the invention consists in the improved construction, combination and arrangement of the several parts as will be hereinafter more fully described, subsequently claimed and illustrated in the accompanying drawings in which similar reference characters designate corresponding parts throughout the several views, and wherein—

Referring in detail to the drawings B designates a bolt and A the part or object through which the bolt is engaged, said bolt having the usual threaded shank portion B' projecting from one face of the object. Upon the bolt the nut N is adapted to be threaded. This nut may be of octagonal, hexagonal or any other desired polygonal form.

The nut lock constituting the subject matter of the present invention is in the form of a washer generally designated by the numeral 5, having a marginal portion 6 of substantially rectangular form in cross section and preferably having an exterior outline corresponding to the shape of the nut N.

The body of the washer 5 is formed with an inwardly extending flange 7, said flange normally being obliquely disposed or extending at an angle radially through the opening of the washer from one side face of the washer to the other side face thereof, said flange being wholly disposed within the plane of the marginal portion 6 of the washer plate. This flange is radially split at spaced points as indicated at 8 so that it will more readily give or yield. The washer plate is preferably constructed of spring steel, though if desired it may be formed from a suitable malleable metal.

Figure 3:
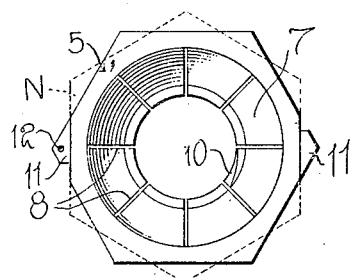
Fig. 3 is a face view of the locking washer as seen in Fig. 1.
Figure 4:
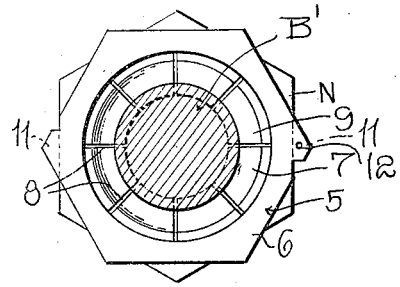
Fig. 4 is a section taken on the line 4—4 of Fig. 2.
Figure 1:
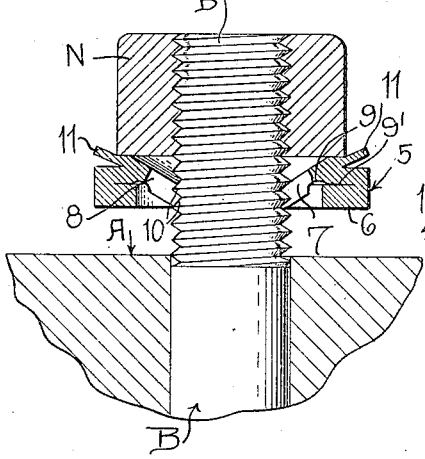
Figure 1 is a longitudinal section illustrating the preferred embodiment of my improved nut lock and showing the normal positions of the several parts of the locking washer before the nut is locked upon the bolt.

In order to insure the requisite flexing or bending movement of the flange 7 at its juncture with the body of the washer 5, I provide an angular groove or channel 9 in one face of the flange and which is extended at its outer side into the body 6 of the washer plate as indicated at 9'. The several sections of the split flange 7 are provided on their inner ends with threads 10 for engagement with the threads B' on the bolt. At diametrically opposite points of the washer plate, tongues 11 are struck or cut from the body of the plate and bent as seen in Fig. 1 to angularly project from the face of the washer plate. One of these tongues 11 is provided with an aperture 12 for the purpose of receiving a sealing wire which may be employed when the device is to be used for locking the parts of delicate machinery and to prevent any possibility of the nut being manually turned and removed from the bolt so that the machine could be tampered with or operated by unauthorized parties.

Figure 2:
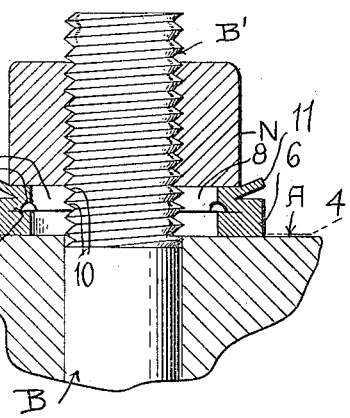
Fig. 2 is a similar view, showing the nut locked on the bolt.

In the operation and use of my improved nut lock, the washer 5 and the nut N are threaded upon the bolt as seen in Fig. 1. When the washer is disposed in a position in spaced relation to the face of the object as in Fig. 1, the wrench is then applied to the nut N and the nut is turned to force the outer body portion of the washer plate into engagement with the face of the object. In this operation, it will be manifest that as the flange 7 has threaded engagement upon the bolt, said flange will be moved toward a horizontal plane, and will exert a binding tensional pressure upon the valley and crown portions of the bolt threads. This position of the washer flange is illustrated in Fig. 2. The tendency of this flange to return to its normal position causes the washer plate to exert a lateral pressure against the opposed face of the nut, so that both the washer and the nut will be tightly locked upon the bolt and held against turning movement with respect thereto or with relation to each other. Of course, it will be understood that it is not essential that the split flange shall move to a position at right angles with respect to the axis of the bolt as in Fig. 2, as the same locking action would result with the flange disposed at an oblique angle at any intermediate point between the positions shown in Figs. 1 and 2 of the drawing. The tongues 11 are finally bent over toward the faces of the nut. When it is desired to further tighten the nut, a wrench is applied to the nut and it is turned so as to ride over these resilient tongues 11, and the same action takes place in removing the nut. When the nut is threaded outwardly upon the bolt, the body of the washer 5 will be urged away from the face of the object by the resilient flange 7 which returns to its original condition as seen in Fig. 1. The annular groove or channel 9 provided in the flange, allows of a radial compression and tensioning of the flange and the contiguous body portion of the washer when the latter is forced to its locked position against the face of the object.

From the foregoing description taken in connection with the accompanying drawing, the construction and manner of operation of my improved nut lock will be clearly and fully understood. The locking washer in which is embodied all features of the invention, may be inexpensively produced in a single stamping operation, and it is then only necessary to provide the threads on the washer flange 7. The washer may be made either of the same size as the nut in conjunction with which it is to be used or of a larger size. It is to be noted that when the device is applied and in use, there are no projections which are likely to be accidentally struck and broken and which might possibly result in the loosening or release of the nut. The nut can be securely locked on the bolt easily and quickly by means of the ordinary wrench and at any point on the bolt. It is also to be noted that no structural changes of any character whatsoever are necessary either in the bolt or the nut so that the strength thereof is not reduced nor is an excessive strain placed upon the bolt in the use of my device: The bolt threads are in no wise injured, unless the attempt is made to remove the nut without first unlocking the nut from the washer. It is absolutely requisite, before the nut can be moved that it shall be turned by means of a wrench against the holding action of the resilient tongues 11. The locking washer can of course be provided with additional spring tongues 11 as desired, and this washer may be of greater thickness than illustrated for application to larger sizes of bolts. The several structural features of the device are also susceptible of considerable modification, and it is therefore to be understood that while I have herein illustrated the preferred form and construction of the device, I reserve the privilege of resorting to all such legitimate changes as may be fairly embodied within the spirit and scope of the invention as claimed.

Having thus fully described my invention, what I claim and desire to secure by Letters Patent is:—

1. A locking washer for nuts having a marginal body portion provided with an annular resilient flange extending inwardly from said body portion at an angle with respect to the axis of the washer, one side face of the flange having an annular groove therein contiguous to the marginal body portion of the washer to permit of the radial compression of the metal at the juncture of said flange with the body portion when the flange is deflected from its normal position.

2. A locking washer for nuts having a marginal body portion provided with an annular resilient flange extending inwardly from the body of the washer, the inner edge of the flange being threaded for engagement with the threads of a bolt, said flange having an annular groove in one face thereof contiguous to the marginal body portion of the washer, and said body portion having an annular split projecting outwardly from said groove, said groove and split permitting of the radial compression of the metal when the flange is deflected from its normal position.

In testimony whereof I hereunto affix my signature in the presence of two witnesses.

T. JEFFERSON BIGGS.

Witnesses:
ALLEN CLIFF,
JOHN L. MORGAN.